United States Patent
Kersting et al.

[11] Patent Number: 5,540,475
[45] Date of Patent: Jul. 30, 1996

[54] TONNEAU COVER ASSEMBLY CLAMPING ASSEMBLY

[75] Inventors: Benjamin Kersting, Bristol; Ross Weldy, Elkhart, both of Ind.

[73] Assignee: Custom Form Manufacturing, Inc., Elkhart, Ind.

[21] Appl. No.: 270,479

[22] Filed: Jul. 5, 1994

[51] Int. Cl.$^6$ ........................................................ B60P 7/04
[52] U.S. Cl. .............. 296/100; 24/522; 224/331; 269/43; 269/210; 403/388; 403/409.1
[58] Field of Search ................ 296/100, 36; 248/316.1, 248/316.4, 316.6, 231.6, 231.4, 231.3; 24/458, 455, 514, 522; 224/329, 331; 403/388, 409.1, 405.1; 269/43, 210, 236

[56] References Cited

U.S. PATENT DOCUMENTS

| | | | |
|---|---|---|---|
| 273,215 | 2/1883 | Wright | 269/236 |
| 828,113 | 8/1906 | Hillebrandt | 269/236 |
| 3,578,378 | 5/1971 | Anderson | 296/137 |
| 3,909,899 | 10/1975 | Emerson | 24/514 |
| 4,036,521 | 7/1977 | Clenet | 296/100 |
| 4,496,184 | 1/1985 | Byrd et al. | 296/100 |
| 4,547,014 | 10/1985 | Wicker | 296/100 |
| 4,639,033 | 1/1987 | Wheatley et al. | 296/100 |
| 4,730,866 | 3/1988 | Nett | 296/100 |
| 4,838,602 | 6/1989 | Nett | 296/100 |
| 4,854,016 | 8/1989 | Rice | 24/514 X |
| 4,877,283 | 10/1989 | Little et al. | 296/100 |
| 4,953,820 | 9/1990 | Yoder | 248/231.5 |
| 5,058,652 | 10/1991 | Wheatley et al. | 160/327 |
| 5,076,338 | 12/1991 | Schmeichel et al. | 160/368.1 |
| 5,152,574 | 10/1992 | Tucker | 296/100 |
| 5,310,238 | 5/1994 | Wheatley | 296/100 |

OTHER PUBLICATIONS

Brochure—Aluminum Frame Tonneau Cover (date unknown).
Brochure—Sport Masters (date unknown).
Brochure—Sport Masters (date unknown).
Brochure—The Luxxus Advantages: (date unknown).
Brochure—Pick–Up Pleaser Covers (date unknown).
Brochure—Extang Tuff Tonno (date unknown).
Brochure—Sport Masters (date unknown).
Brochure—The Fastback Rigid Tonneau Cover (date unknown).

*Primary Examiner*—David M. Mitchell
*Assistant Examiner*—Kia M. Robinson
*Attorney, Agent, or Firm*—Barnes & Thornburg

[57] ABSTRACT

A tonneau cover assembly is provided having a rail system, a cover and one or more clamping mechanisms. The clamping mechanism includes a two-piece clamp. The first member is engageable with the rail, and includes an abutment mechanism thereon to contact the rail. The first member also includes a pivotable lever which can be used to exert a force on the second member. The first member includes an opening therein to receive the second member therethrough. The second member includes an extension having one or more teeth thereon. The extension is positioned through the opening in the first member, such that the teeth may engage a portion of the first member. The second member also includes a portion which is engageable with a vertical rail of the side wall of the vehicle. By actuating the lever, the clamp is positioned securely to the rail and the vehicle side wall.

16 Claims, 2 Drawing Sheets

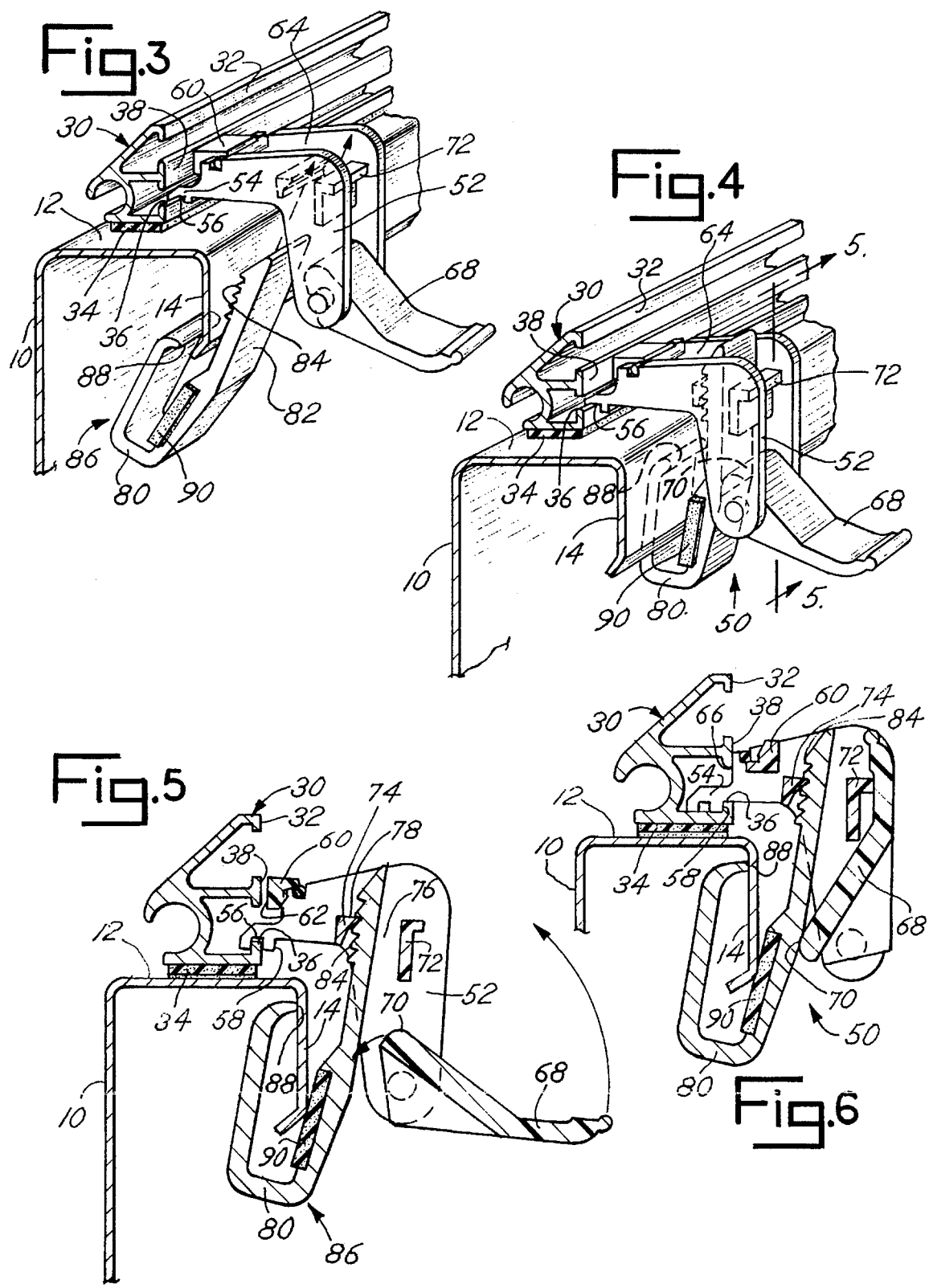

TONNEAU COVER ASSEMBLY CLAMPING ASSEMBLY

BACKGROUND AND SUMMARY OF THE INVENTION

The present invention relates generally to tonneau covers for vehicles. More specifically, the present invention relates to a clamping mechanism for use with a tonneau cover, which can be used with a pickup truck.

In recent years, tonneau covers have become more popular, and can be seen in use every day. Generally, a tonneau cover can be a device which is used to cover an opening in a vehicle. Tonneau covers are commonly used to cover seating sections of boats and convertible cars. Tonneau covers are also commonly associated with pickup trucks. When transporting items in the bed of a truck, it is often desirable to shelter the objects from the elements. A tonneau cover provides this protection.

Tonneau covers typically include a cover, a rail system connected to the vehicle, and a clamping mechanism used to secure the rail to the vehicle. Some tonneau covers also utilize cross bows, which support the cover in position. The use of clamps to secure the rails to the pickup truck is particularly useful because they avoid the necessity for making holes in the truck bed to secure the rail. Such permanent disfiguration can lead to deterioration of the vehicle, and can decrease the value of the pickup truck. Therefore, it is generally desired to attach the rail network to the vehicle without making holes in the truck.

Many forces act upon the tonneau cover when in use, which can cause the cover to pull the rail network inward toward the center of the vehicle bed. The weight of the cover itself, the tension in the cover and shrinkage of the cover tend to provide a bending moment or torsional effect on the rail network. This can cause the rail to separate from the vehicle side walls, allowing water or air to seep into the pickup truck bed. After time, this bending moment can cause warping of the rail network. Thus, if a clamping arrangement is to be used, it is desirable to provide a clamp which will securely hold the rails to the vehicle.

Accordingly, it is an object of the present invention to provide a tonneau cover assembly which includes a rail system and a clamping mechanism, such that the clamping mechanism maintains the rails in a secure fit against the pickup truck side wall.

Another object of the present invention is to provide a tonneau cover assembly which may be quickly and easily installed and removed.

A further object of the present invention is to provide a tonneau cover assembly which does not permanently disfigure the pickup truck.

These and other objects are attained by a tonneau cover assembly generally comprising a cover, at least one rail and a clamping mechanism. Additionally, cross bows may be used. The rails are secured to the top of the pickup truck side wall by the clamping mechanism. The cover is then extended over the bed of the truck, and secured to the rails.

The clamps used in the present invention are typically of a two-piece construction, including a first member and a second member. The first member includes a tang at one end, having a groove therein. The groove is designed to receive a lip on the rail. The first member also includes an abutment mechanism. The abutment mechanism includes a block which is pivotally mounted on an axis. The block includes an abutment surface thereon, which abuts and contacts a surface on the rail. Alternatively, the block may be pivoted into a slot in the first member, thus exposing shoulders on the first member. The shoulders may then rest flush against a surface on the rail.

The first member also includes a lever which is pivotally mounted to the first member. The lever includes a camming surface thereon, which may contact the second member. The first member further includes a flange and a rib, spaced apart to create an opening therebetween. The flange acts as a stop mechanism for the lever. The rib includes a ledge thereon, which is directed substantially toward the opening.

The second member includes an extension which may be positioned between the rib and the flange of the first member, through the opening. The extension includes one or more teeth thereon, which are engageable with the ledge of the rib. The second member also includes a portion which is engageable with the side wall of the vehicle. This may include a bight, which surrounds a portion of the vertical rail of the side wall. The bight includes a contact surface which contacts one side of the vertical rail, and a rim which may contact the opposite side of the rail.

After the second member is positioned with respect to the first member, the lever can be actuated. By actuating the lever, the camming surface contacts the second member, thereby exerting a force on the second member. The second member pivots into contact with the vertical rail of the side wall. The first member moves with respect to the second member, with the tooth as the pivot point. The contact surface of the second member contacts the vertical rail, while the rim may or may not contact the vertical rail.

To disengage the clamp, the lever is opened, thus relieving the camming force. The extension is pushed away from the rail piece, and can be removed from the opening. The second member and first member can then be successively removed from the rail.

Other objects, advantages and novel features of the present invention will become apparent in the following detailed description of the invention when considered in conjunction with the accompanying drawings.

BRIEF DESCRIPTION OF THE DRAWINGS

FIG. 3 is a perspective view of an embodiment of the present invention, showing the positioning of the two members of the clamp of the present invention.

FIG. 4 is a perspective view of an embodiment of the present invention, showing the relative positions of the two members of the clamp of the present invention, prior to actuation of the lever.

FIG. 5 is a side cut-away view of an embodiment of the present invention showing the motion of the lever and camming surface.

FIG. 6 is a side cut-away view of an embodiment of the present invention showing an alternate positioning of the first member of the clamp with respect to the rail.

DETAILED DESCRIPTION OF THE PREFERRED EMBODIMENTS

Figure 1:
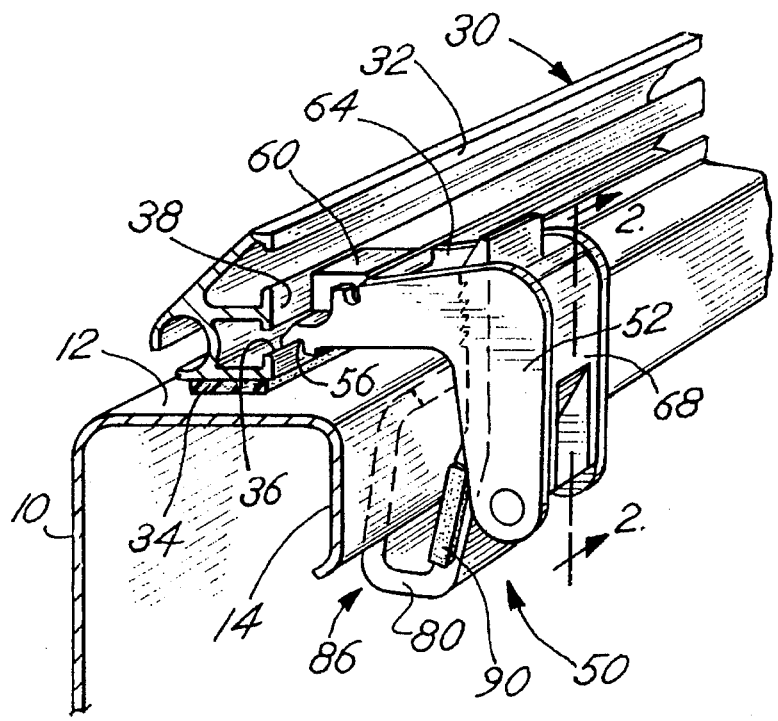
FIG. 1 is a perspective view of an embodiment of the present invention.

A tonneau cover can be used to cover the bed of a pickup truck, or the passenger section of a boat or car. The present invention is shown in use with a pickup truck. Typically, the pickup truck includes sidewall 10, having a top rail 12, and a depending vertical rail 14.

The tonneau cover of the present invention includes a cover (not shown), one or more cross bows (not shown), rail system 30 and one or more clamps 50. The cover may be made of most any flexible material, such as vinyl. The bows can be placed across the width of the truck bed to support the cover. The bows are preferably made of a substantially rigid material, such as aluminum.

Rail system 30 is preferably made of a substantially rigid material, such as aluminum. Rail system 30 includes one or more rail pieces 32 which can be secured to the vehicle. As shown, rail system 30 includes four rail pieces: one for each side wall, one for the front wall and one for the tailgate. As an example, rail piece 32 fits on top rail 12 of the pickup truck. A cushion 34 or padding may be used to prevent scratching of the vehicle. Cushion 34 also can act as a seal, preventing moisture from seeping into the truck bed.

Rail piece 32 extends substantially the entire length of top rail 12. Rail piece 32 includes lip 36, which extends in a generally upward fashion. Rail piece 32 also includes surface 38. Surface 38 extends in a generally vertical fashion.

Clamp 50 may be used to secure rail system 30 to the vehicle. A plurality of clamps 50 may be used, spaced along the length of rail piece 32. As shown, clamp 50 is a 2-piece mechanism, including first member 52 and second member 80.

First member 52 may be made of a generally rigid, durable material such as plastic. First member 52 is designed to engage rail piece 32. First member 52 includes tang 54 thereon. Tang 54 includes groove 56 cut therein. Groove 56 is open in a generally downward direction, and is dimensioned to receive lip 36 of rail piece 32 therein. Tang 54 may also include interior surface 58. Tang 54 can be seen in FIGS. 3, 5 and 6.

Figure 2:
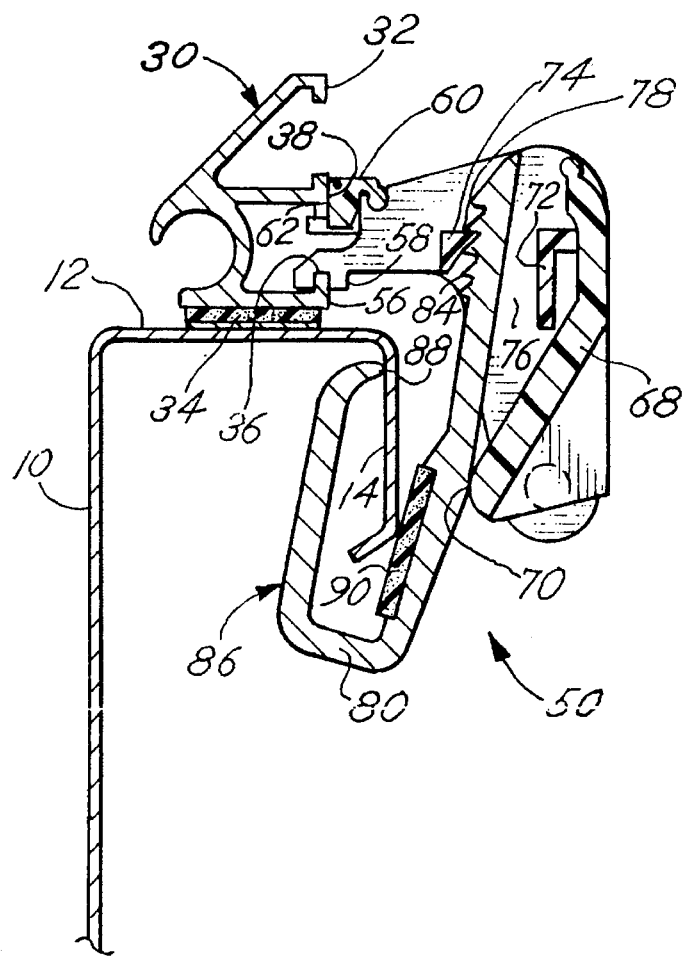
FIG. 2 is a side cut-away view of an embodiment of the present invention.

First member 52 also includes a mechanism to abut rail piece 32. Adjacent tang 54, first member 52 includes block 60. Block 60 is pivotally mounted to first member 52. Block 60 includes abutment surface 62 thereon. In certain arrangements, abutment surface 62 of block 60 may abut surface 38 of rail piece 32. See FIG. 2. In other arrangements, block 60 may be pivoted into slot 64 of first member 52. In this arrangement, opposing shoulders 66, located on opposite sides of first member 52 contact surface 38 of rail piece 32. This can be seen in FIG. 6.

Substantially opposite tang 54, first member 52 includes lever 68. Lever 68 is pivotally mounted to first member 52. Lever 68 includes camming surface 70 thereon.

First member 52 also includes flange 72 and rib 74. Flange 72 and rib 74 are situated so as to create opening 76 therebetween, as seen in FIG. 5. Flange 72 acts as a stop mechanism for lever 68, preventing the level from further rotation. Rib 74 includes ledge 78 thereon. Ledge 78 extends substantially transverse from rib 74, adjacent opening 76.

Second member 80 is also made of a substantially rigid, durable material, such as aluminum. Second member 80 includes extension 82. Extension 52 is dimensioned so as to be receivable within openings 76 of first member 52. Extension 82 includes a serrated portion; which forms one or more teeth 84 on the extension.

Second member 80 also includes a portion which is positionable adjacent vertical wall 14 of the vehicle, generally referred to as bight 86. Bight 86 includes rim 88 and contact surface 90. Rim 88 may be used to contact one side of vertical rail 14; contact surface 90 may be used to contact the opposite side of vertical rail 14.

To secure rail piece 32 to the vehicle, first member 52 is positioned against the rail. First member 52 can be positioned in one of two ways. In one arrangement, block 60 is positioned such that abutment surface 62 of block 60 faces rail piece 32 and contacts surface 38. Lip 36 on rail piece 32 is positioned within groove 56 of tang 54. In a second arrangement, block 60 is pivoted into slot 64, allowing shoulders 66 to contact surface 38. Tang 54 is positioned substantially within rail piece 32, such that lip 36 contacts interior surface 58 of tang 54. In both arrangements, lever 68 is initially pivoted to an open position.

Next, second member 80 is positioned. Second member 80 is situated such that bight 86 wraps around vertical rail 14. Extension 82 is placed between flange 72 and rib 74, through opening 76. Each tooth 84 may successively engage and rest on ledge 78. Each tooth 84 provides a progressively tighter fit of second member 80 to first member 52 and to rail piece 32. Thus, the position of second member 80 relative to first member 52 is variable, depending on which tooth 84 engages ledge 78.

After second member 80 is in place with the desired tooth 84 in engagement with rib 74, lever 68 can be actuated. Pivoting lever 68 towards a closed position causes camming surface 70 to contact second member 80. This action exerts a force on second member 80. Second member 80 then exerts a force back onto camming surface 70, and first member 52. Second member 80 remains substantially stable as the forces are directed between first member 52 and second member 80. Thus, tooth 84 in engagement with rib 74 acts as a pivot point.

The force exerted by second member 80 onto first member 52, about the pivot point of tooth 84, causes first member 52 to pivot, or swing about the pivot point of tooth 84. Due to the shape of first member 52, the swing or pivot action results in a substantially vertical force being exerted by first member 52 onto rail piece 32, through tang 54. Thus, the pivot interaction of first member 52 and second member 80 combine to secure rail piece 32 to top rail 12.

To release the clamp, lever 68 is opened, relieving the force exerted by camming surface 70 onto second member 80. Extension 82 can then be pushed away from rail piece 32, until tooth 84 disengages ledge 78. Second member 80 can then be removed from first member 52. First member 52 can then be removed from rail piece 32.

From the preceding description, it is clear that the objects of the present invention have been attained. However, the preceding description and its detail is for illustrative purposes only. For example, the dimensions of first member 52 and second member 80 may be modified to accommodate vehicles of various sizes. Other similar modifications to the present invention may be made. The scope of the present invention is to be limited only by the claims which follow.

What is claimed is:

1. The tonneau cover which may be attached to a vehicle, the tonneau cover including a cover, at least one rail, and a clamping mechanism, the clamping mechanism comprising:

a first member having an opening therein, the first member being engageable with the rail;

a second member being engageable with a portion of the vehicle, the second member having a portion thereof which is receivable within the opening of the first member to engage the first member to the second member; and wherein the second member includes at least one tooth thereon which engages a ledge adjacent the opening in the first member.

2. The tonneau cover according to claim 1 wherein the first member includes a camming surface which exerts a camming force on the second member.

3. The tonneau cover according to claim 1 wherein the first member includes an abutment mechanism thereon which abuts the rail.

4. The tonneau cover according to claim 3 wherein the abutment mechanism is adjustable.

5. The tonneau cover according to claim 3 wherein the abutment mechanism includes a block which is pivotable on the first member.

6. The tonneau cover according to claim 1 wherein the first member includes a groove therein for engaging a lip on the rail.

7. The tonneau cover according to claim 1 wherein the second member has a plurality of teeth thereon which are engageable with the ledge adjacent the opening in the first member.

8. A tonneau cover which is attachable to a vehicle, the tonneau cover including a cover, at least one rail, and a clamping mechanism, the clamping mechanism comprising:

a first member engageable with the rail, the first member having a lever thereon;

a second member engageable with a portion of the vehicle and engageable with the first member; and wherein the lever on the first member may be actuated to exert a camming force onto the second member, to secure the rail to the vehicle.

9. The tonneau cover according to claim 8 wherein the lever is pivotable on the first member.

10. The tonneau cover according to claim 9 wherein the lever includes a camming surface thereon which exerts the a camming force on the second member when the lever is actuated.

11. The tonneau cover according to claim 8 wherein the first member includes an opening therein, such that the second member is adjustably disposed within the opening in the first member.

12. The tonneau cover according to claim 11 wherein the second member has at least one tooth thereon which is engageable with the first member adjacent the opening.

13. The tonneau cover according to claim 8 wherein the first member includes an abutment mechanism thereon which abuts the rail.

14. The tonneau cover according to claim 13 wherein the abutment mechanism includes a block which is pivotable on the first member.

15. A tonneau cover attachable to a vehicle, the tonneau cover including a cover, at least one rail, and a clamping mechanism, the clamping mechanism comprising:

a first member engageable with the rail having an opening therein and a lever thereon, the lever having a camming surface thereon, the lever being pivotable about a portion of the first member; and a second member engageable with a portion of the vehicle, the second member having at least one tooth thereon which is engageable through the opening in the first member to secure the first member to the second member.

16. The tonneau cover according to claim 15 Wherein the second member includes a plurality of teeth thereon which are engageable with the first member, allowing the second member to be adjustably positioned with respect to the first member.

* * * * *